US012201565B2

(12) United States Patent
Obert et al.

(10) Patent No.: US 12,201,565 B2
(45) Date of Patent: Jan. 21, 2025

(54) MOBILE OPERATING TABLE COLUMN HAVING AN INTEGRATED STABILITY SYSTEM

(71) Applicant: MAQUET GMBH, Rastatt (DE)

(72) Inventors: Mike Obert, Gernsbach (DE); Martin Staudinger, Waldbronn (DE); Jan Donat Olszewski, Waschgasse (DE); Matthias Kobuss, Gernsbach (DE); Matthieu Hirschel, La Wantzenau (FR)

(73) Assignee: MAQUET GMBH, Rastatt (DE)

( * ) Notice: Subject to any disclaimer, the term of this patent is extended or adjusted under 35 U.S.C. 154(b) by 509 days.

(21) Appl. No.: 17/280,570

(22) PCT Filed: Sep. 26, 2019

(86) PCT No.: PCT/EP2019/076064
§ 371 (c)(1),
(2) Date: Nov. 24, 2021

(87) PCT Pub. No.: WO2020/064942
PCT Pub. Date: Apr. 2, 2020

(65) Prior Publication Data

US 2022/0117818 A1 Apr. 21, 2022

(30) Foreign Application Priority Data

Sep. 28, 2018 (DE) ......................... 102018124136.4

(51) Int. Cl.
*A61G 13/10* (2006.01)
*A61G 13/06* (2006.01)

(52) U.S. Cl.
CPC ........... *A61G 13/104* (2013.01); *A61G 13/06* (2013.01); *A61G 2203/70* (2013.01)

(58) Field of Classification Search
CPC ... A61G 13/104; A61G 13/06; A61G 2203/70
See application file for complete search history.

(56) References Cited

U.S. PATENT DOCUMENTS 2,908,472 A * 10/1959 McDonald .............. F15B 11/16
180/9.5
4,077,086 A * 3/1978 Butler ................. B60B 33/0089
16/33

(Continued)

FOREIGN PATENT DOCUMENTS

CN 101904791 A 12/2010
CN 107072629 A 12/2010

(Continued)

OTHER PUBLICATIONS

Chinese Patent Application No. 2019800741315 First Office Action, 11 pages.

(Continued)

*Primary Examiner* — Myles A Throop
(74) *Attorney, Agent, or Firm* — Frost Brown Todd LLP

(57) ABSTRACT

A mobile operating table column comprising a base and a stability system for ensuring that the base rests securely on an uneven surface, wherein the stability system comprises: four retractable and extendable upright support elements arranged at four different corners of the base, as well as support surfaces and an actuator for retracting and extending each of the four upright support elements. Each upright support element is associated with a support surface and can be retracted and extended relative to the latter.
Moreover, the stability system may assume at least two different operating states:

i) a parked state, in which the base rests on the floor with at least three of the support surfaces and the upright support elements are retracted; and
ii) a fixed stationary state, in which the base rests on the surface with at least three of the support surfaces and the support elements are extended such that they are in (Continued)

contact with the surface and thereby ensure that the base rests securely on the floor.

21 Claims, 4 Drawing Sheets

(56) References Cited

U.S. PATENT DOCUMENTS

| | | | | | |
|---|---|---|---|---|---|
| 4,186,917 | A * | 2/1980 | Rais | A61G 13/02 5/614 |
| 4,668,029 | A * | 5/1987 | Maizlish | B60B 33/06 312/351.13 |
| 4,669,136 | A | 6/1987 | Waters et al. | |
| 4,833,972 | A | 5/1989 | Bohusch et al. | |
| 4,865,303 | A * | 9/1989 | Hall | A61G 13/04 5/618 |
| 5,320,047 | A * | 6/1994 | Deurloo | F15B 11/22 60/579 |
| 5,564,662 | A * | 10/1996 | Lussi | F16M 7/00 5/310 |
| 6,026,934 | A * | 2/2000 | Deurloo | B66B 9/04 187/274 |
| 6,626,405 | B1 * | 9/2003 | Keast | A47B 91/06 248/346.11 |
| 6,678,907 | B1 * | 1/2004 | Voelker | A61G 7/0528 5/11 |
| 6,681,423 | B2 | 1/2004 | Zachrisson | |
| 7,047,738 | B2 * | 5/2006 | Bair | F15B 11/22 60/593 |
| 7,832,528 | B1 * | 11/2010 | Liang | B60T 1/14 5/614 |
| 9,771,092 | B2 * | 9/2017 | Johnson | B60K 7/0007 |
| 10,945,905 | B2 * | 3/2021 | Hoel | A61G 13/1285 |
| 11,266,241 | B2 * | 3/2022 | Timenes | A47B 91/16 |
| 2007/0186827 | A1 * | 8/2007 | Loftus | B65D 19/42 280/43.24 |
| 2008/0035190 | A1 * | 2/2008 | Baker | A61H 3/02 135/73 |
| 2018/0147104 | A1 * | 5/2018 | Timm | A61B 34/30 |
| 2018/0147105 | A1 | 5/2018 | Timm et al. | |
| 2018/0156383 | A1 * | 6/2018 | Unger | F16M 13/022 |
| 2020/0060916 | A1 * | 2/2020 | Inoue | A61G 13/02 |
| 2021/0254637 | A1 * | 8/2021 | Eriksson | F15B 11/044 |
| 2022/0033103 | A1 * | 2/2022 | O'Neill | A47B 91/16 |

FOREIGN PATENT DOCUMENTS

| | | | |
|---|---|---|---|
| CN | 203001349 | U | 6/2013 |
| DE | 197 15 147 | A1 | 1/1991 |
| DE | 199 29 907 | A1 | 12/2000 |
| DE | 10 2010 051 126 | | 5/2012 |
| DE | 10 2012 001 555 | | 8/2013 |
| EP | 2371337 | A1 | 10/2011 |
| EP | 2565350 | A1 | 3/2013 |
| JP | S 60-076923 | U | 5/1985 |
| JP | S 62-100044 | U | 6/1987 |
| JP | 2003065491 | A | 3/2003 |
| JP | 2003237303 | A | 8/2003 |
| WO | WO 2018/098444 | A1 | 5/2018 |
| WO | WO 2018149691 | A1 | 8/2018 |
| WO | WO 2018154750 | A1 | 8/2018 |
| WO | WO 2018222564 | A1 | 12/2018 |

OTHER PUBLICATIONS

Chinese Patent Application No. 2019800741315 Second Office Action, 5 pages.
Chinese Patent Application No. 2019800741315 First Search Report, 1 page.
European Patent Application No. 19782945 Search Results, 1 page.
International Search Report and Written Opinion for PCT/EP2019/076064 mailed on Jan. 9, 2020, 6 pages.
Japanese Patent Application No. 2021517364 Notice of Reasons for Refusal dated Jul. 2, 2024, 2 pages.
Japanese Patent Application No. 2021517364 Notice of Reasons for Refusal dated February 6. 2024, 3 pages.
Japanese Patent Application No. 2021517364 Notice of Reasons for Refusal dated September 5. 2023. 5 pages.
Japanese Patent Application No. 2021517364 Search Report, 15 pages.
"MFI Medical, General Surgical Table", for STERIS Corporation: STERIS® 4085 General Surgical Table. Mentor, OH, USA, 2016 (M3309EN.2016.05, Rev B). S. 1-8; Web page located at https://mfimedical.com/products/steris-4085-general-surgical- table?variant=40089771212877&currency=USD&utm_medium=product_sync&utm_source =google&utm_content=sag_organic&utm_campaign=sag_organic&gclid=CjwKCAjwk8e1B hALEiwAc8MHiHm19KYUNojQau-v0GwYZiDop_aMdZYmd3PA- VzQUp INOJOKOyCVhoCdNMQAvD BwE, accessed on Aug. 6, 2024, 4 pages.
"Steris Homepage", Web page located at www.steris- healthcare.com/medias/docs/9deef3481749665c78aa9b41446c6478a57a2c44.pdf., accessed on Aug. 6, 2024, 8 pages.

* cited by examiner

STAND DER TECHNIK

STAND DER TECHNIK

MOBILE OPERATING TABLE COLUMN HAVING AN INTEGRATED STABILITY SYSTEM

The present disclosure relates to mobile operating table columns with an integrated stability system, which are used in operating tables.

BACKGROUND OF THE DISCLOSURE

Mobile operating table columns are known in the prior art. They usually comprise a column shaft and a base with castors for moving the operating table column thereby making it suitable for transporting a patient without any further auxiliary means.

During a surgical procedure, a safe upright position of the operating table column on the floor surface must be ensured. On some operating table columns this is done by locking the castors, while on other operating table columns the castors may be retracted into the base. Thus, a chassis of the base may be lowered such that it rests on the floor. For transport purposes, contact between the chassis and the floor may be removed.

FIGS. 1 and 2 show an operating table 1' with such a mobile operating table column 7' and a patient support surface 4' connected thereto.

The operating table column 7' comprises a base 2' for placing the table column 7' on the floor of an operating theatre, and a column shaft 3' arranged vertically on the base 2'. The base 2' has passive retractable and extendable castors 8' (FIG. 2). The column shaft 3' is arranged on the base 2' such that the base 2' may be divided into two sections of different lengths, namely a short base section Ta and an oblong base section 2*b* (FIGS. 1 and 2).

In this prior-art operating table column 7', a secure base on an uneven floor is realized in that the table column 7' rests solely on three upright support elements 5'*a-c* arranged on the bottom surface of the base 2' after retraction of the castors 8'. Thus, two upright support elements 5'*a* and 5'*b* are arranged in two different corners of the short base section Ta, whereby the third upright support element 5'*c* is positioned centrally between the two corners of the long base section 2'*b* (see FIG. 2). Such an arrangement of the upright support elements 5'*a-c* results in a support triangle D.

In order to prevent the operating table column 7' from tipping over if the center of gravity of the operating table 1' leaves the mounted support triangle D, additional base buffers 6'*a-b* are located at the two corners of the oblong base section 2*b*. The support buffers 6'*a-b* contact the floor after slight tilting of operating table column 7'.

The disadvantage here is that although the operating table column 7' will not tip over in this fashion, a shift in the center of gravity can still cause movement of the operating table column 7' Such movement results in displacement of the patient support surface 4', which poses a significant risk to the patient during a surgical procedure.

U.S. Pat. No. 5,564,662 discloses a hydraulic stability system for a base 12 of a mobile operating table 10. It describes a so-called floor locking system, which has three primary locking elements 30, 32, 34 and two secondary locking elements 56, 58, each comprising a hydraulic cylinder 38, 40, 42, 60, 62. To stabilize the table base 12 on an uneven surface, a large hydraulic pressure is first applied to the three hydraulic cylinders 38, 40, 42 of the primary locking elements 30, 32, 34. As a result, they extend from the foot 12 and thereby lift non-retractable castors 26, 28 of the foot 12 off the floor. The arrangement of the primary hydraulic cylinders 38, 40, 42 in the base 12 creates a support triangle corresponding to the support triangle D of the upright support elements 5'*a-c* described above. The hydraulic cylinders 60, 62 of the secondary locking elements 56, 58 do not provide any lifting force to the operating table 10, instead they have an anti-tilt function in order to further stabilize the support triangle and thus protect the operating table 10 from shifting.

However, it is problematic that the floor locking system of U.S. Pat. No. 5,564,662 comprises exclusively hydraulic elements such that a malfunction of the hydraulics may cause all hydraulic cylinders 38, 40, 42, 60, 62 to inadvertently retract into the foot 12 during operation. Such a malfunction causes all or part of the operating table 10 to sag or tip forcefully, thus posing a risk of injury to the patient during a surgical operation. Furthermore, in this case, the operating table 10 would again rest on the unlocked castors 26, 28, allowing it roll away. Even if only the secondary locking elements 56, 58 should fail, a shift in the center of gravity may cause the table 10 to shift, which in turn entails a risk for the patient.

Another generic stability system for operating table columns is offered by the company STERIS®. This company sells mobile operating table columns with a so-called self-levelling floor lock. This system is presented in the brochure entitled "Steris® 4085—General Surgical Table—Advancing Care through Practical Innovation." The brochure was published by STERIS® in 2016 and describes the operating table 4085 marketed by STERIS®. The brochure can be downloaded from the STERIS® homepage at www.steris_healthcare.com/medias/docs/9deef3481749665c78aa9b41446c6478aa5 7a2c44.pdf.

The STERIS operating table column comprises a base and a column shaft positioned thereon. The base is equipped with four passive castors. These protrude at a fixed distance from the bottom surface of the base. This means that the castors cannot be retracted into the base. Furthermore, the STERIS base is height-adjustable via four hydraulic cylinders located in four corners of the base.

Upon moving the operating table column to a desired location, the hydraulic cylinders are extended and the castors are lifted off the floor. This ensures a stable position of the operating table column. The hydraulic cylinders extend such that they compensate for uneven floors.

A disadvantage of this stability system is that the hydraulic cylinder rams may retract unintentionally in the event of a sudden drop in hydraulic pressure. This causes sagging of the operating table column, which must not happen, especially during a surgical procedure. What's more, the operating table column then again rests on the castors allowing it to roll away, which is a further risk during a surgical operation.

a. Document DE 10 2010 051 126 A1 describes a mobile base 10 of an operating table, see FIG. 1. This base 10 includes a central support 12 and two foot extensions 14 and 16. According to para. 3, the problem lies in making possible wobble-free positioning of the operating table.
b. The requisite solution proposed is shown in FIG. 4. Opposing castors 18, 20 are connected with one another in an articulated manner via a linkage 32 and a spindle drive 30. Each castor 18, 20 is attached to a pivot plate 22, 24, 26, 28. This mechanical system allows the two castors 18, 20 of a pair of castors to be folded in and out in order to position the operating table.

c. The corresponding kinematics is shown in FIGS. 3A to 3C. FIG. 3A shows the driving position, wherein the castors 18, 20 are extended. The four castors 18, 20 rest on the floor B and support the total weight of the operating table.

d. When the operating table has been moved to a desired location, it can be transposed into a standing position by folding in the castors 18, 20, as shown in FIG. 3B. In the standing position, all castors 18, 20 are raised from the floor B. The operating table rests on four supports 40, 42.

e. The castors 18, 20 are subsequently lowered again, such that they come into contact with the floor B, as shown in FIG. 3C. Placing the castors 18, 20 on the floor B prevents tilting of the operating table while in the standing position. A disadvantage here is that, since the supporting effect provided by the applied castors 18, 20 is not really effective at the edge of the operating table, the operating table may still tilt in certain situations, if the weight is shifted during an operation, and before an outer support 40, 42 reaches the floor and thus prevents movement.

SUMMARY OF THE DISCLOSURE

It is an object of the present disclosure to provide a mobile operating table column, which has a stability system for ensuring a secure position on any surface and, in particular, on an uneven surface, and which continues to ensure a secure position even in the event of a malfunction such that any hazard to the patient is excluded.

A further object of the present disclosure is to provide an operating table column, in which a stable motionless upright position is always provided, even with all the conceivable shifts in the center of gravity during use.

According to the present disclosure, these objects are achieved with a mobile operating table column, which has one or more of the following features:

a base; and a stability system for ensuring a secure position of the base on an uneven surface, wherein the stability system comprises the following:

four retractable and extendable upright support elements located at four different corners of the base; and an actuator for retracting and extending each of the four upright support elements, characterized in that the stability system has four support surfaces arranged at the four different corners of the base;

each upright support element is associated with a support surface and can be retracted and extended relative thereto; and the stability system can assume at least the following two different operating states:

(i) a parked state in which at least three of the support surfaces of the base rest on the floor and the surface elements are retracted; and (ii) a fixed stationary state, in which the base is seated on the floor with at least three of its support surfaces, and the upright support elements are extended, such that they contact the floor and thereby ensure that the base rests securely on the floor.

By designing the stability system such that the fixed stationary state has the configuration just described, the following is achieved:

The four upright support elements touching the floor span a quadrangle which substantially covers the entire bottom surface of the base. This prevents a shift in the center of gravity from causing the mobile operating table column to wobble or tilt;

In the event of a malfunction of the hydraulics causing the retraction of the upright support elements, the base continues to rest on at least three support surfaces. This further ensures a reliable upright position of the operating table column, except from possible tilting, if the fourth support surface is not contacting the surface.

The actuator may be designed such that it allows for simultaneous retraction and extension of all upright support elements. Preferably, it can lock each upright support element in its extended position, once securely resting on the floor. The actuator may be a hydraulic, pneumatic or electromotive actuator. The actuator may also be arranged such that all the upright support elements are extended using substantially the same force.

A separate positioning member can be assigned to each upright support element providing for its retraction and extension.

The positioning members may be controlled jointly and centrally by a control device. The control device may comprise a central drive unit for driving all positioning members simultaneously. The central drive unit may be a hydraulic pump.

The control device may further comprise a single central switching unit for preferably simultaneous control of the positioning members. The switching unit may be a hydraulic switching valve and in particular a 5/3-way valve. Furthermore, the hydraulic switching valve can be hydraulically connected to the positioning members, which are designed as hydraulic cylinders, via an inlet and outlet conduit and a separate release line.

The control device may further comprise a single central force-limiting unit, such as a pressure reducing valve, associated with the inlet and outlet conduits, and arranged to reduce a pressure prevailing in said inlet and outlet conduits to a predetermined low pressure by means of which, all positioning members may be simultaneously extended. The positioning members may be designed as hydraulic cylinders.

Each upright support element may be attached to a piston rod of its hydraulic cylinder, preferably by means of a ball joint.

Each hydraulic cylinder may have a check valve directly attached to it for the purpose of locking the respective upright support element, when resting securely on the floor.

Each hydraulic cylinder may have a return spring for retracting the respective upright support element.

a. In addition to the contact elements, the base may include castors for moving the operating table column on a floor.

Further, the present disclosure relates to mobile operating tables, mobile tables, mobile table columns that can be used in conjunction with operating tables, mobile devices including equipment, and their use in patient transport and surgical procedures. The disclosure also relates to methods for operating, moving and stabilizing operating tables. The disclosure further includes tables and methods for moving and supporting a human or non-human body (such as a medical training manikin).

BRIEF DESCRIPTION OF THE DRAWINGS

An exemplary embodiment of the present disclosure will be explained in more detail below with reference to the drawings. In the drawings.

DETAILED DESCRIPTION OF THE DRAWINGS

In the following description, exemplary embodiments of the present disclosure are described with reference to the drawings. The drawings are not necessarily to scale, but are merely intended to illustrate the relevant features schematically.

It should be noted that each of the features and components described below may be combined with one another, regardless of whether they were described in connection with an individual embodiment. The combination of features in the respective embodiments is merely illustrative of the basic structure and operation of the claimed device.

Figure 1:
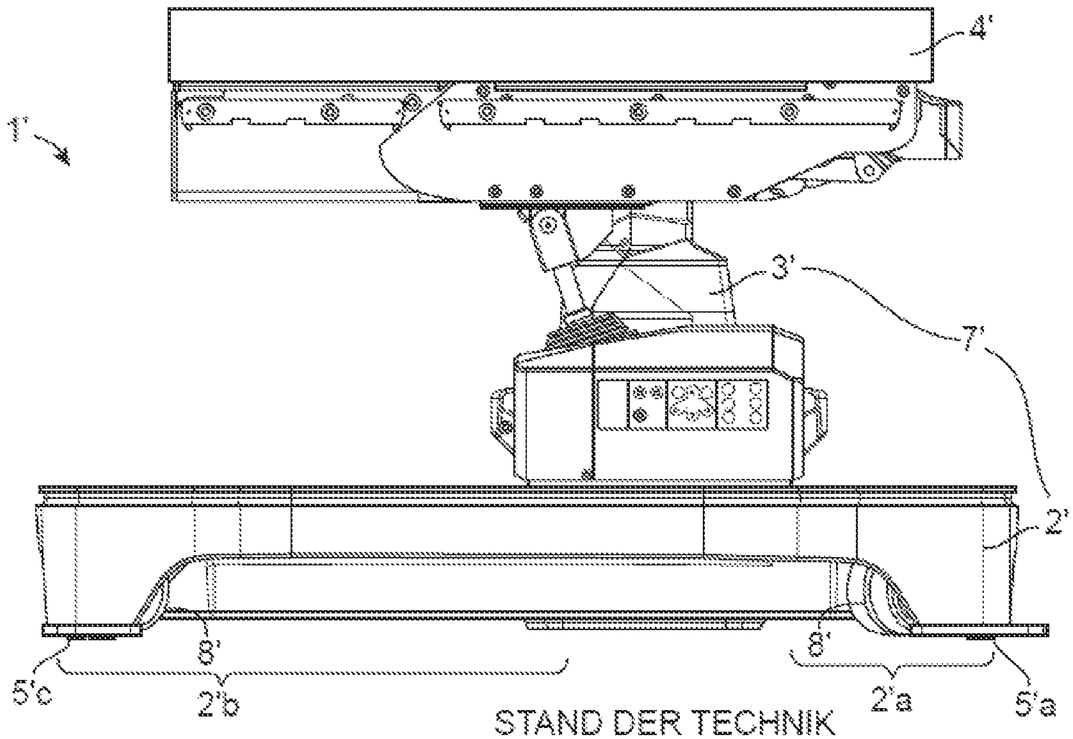
FIG. 1 is a side view of a known operating table comprising a patient support surface and a mobile operating table column with a base and a column shaft.
Figure 2:
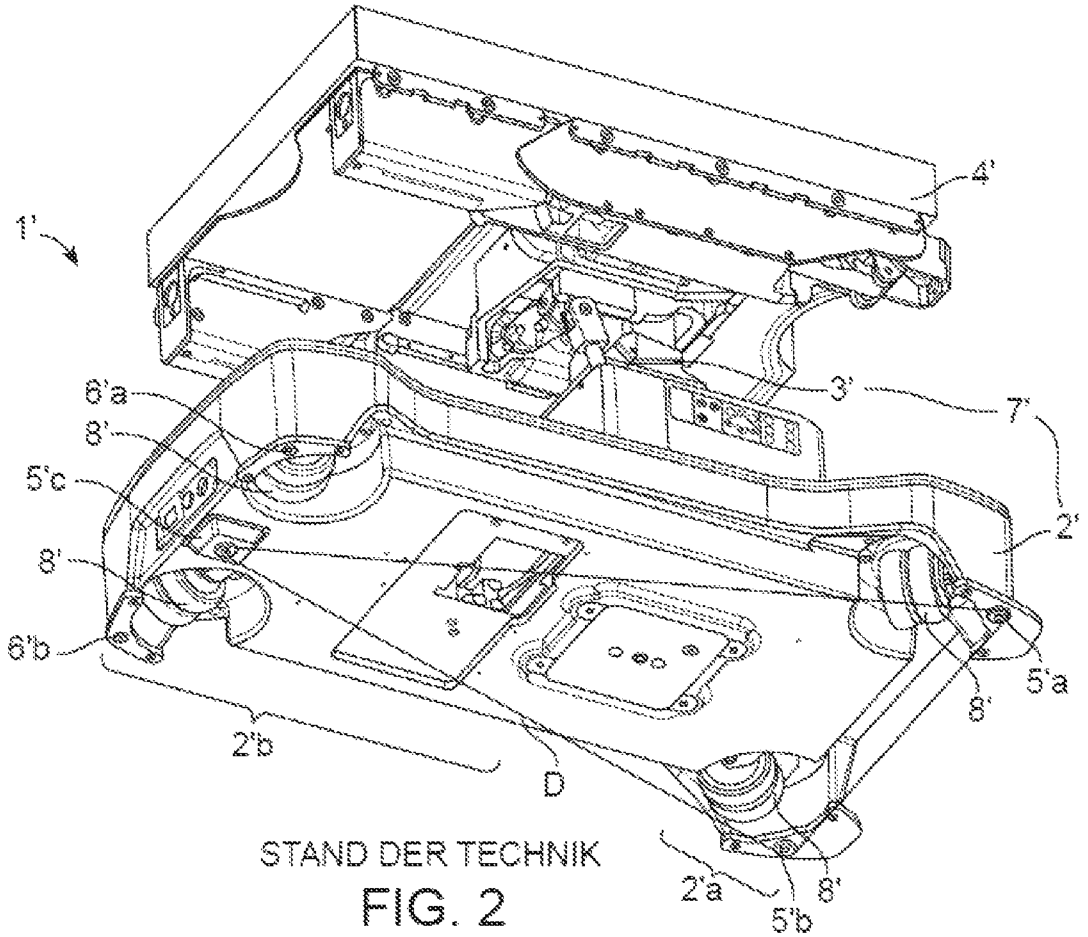
FIG. 2 is a perspective view of the operating table of FIG. 1 with a stability system arranged on a bottom surface of the base, comprising upright support elements and contact buffers.
Figure 3:
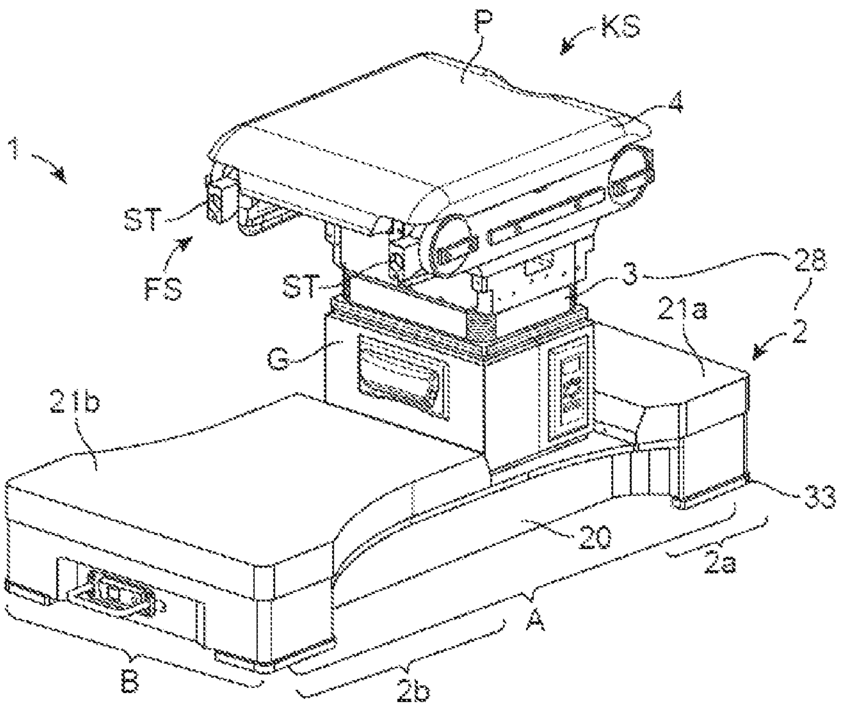
FIG. 3 is a perspective view of an operating table with a mobile operating table column according to the disclosure along with its base.

FIG. 3 shows an operating table 1, which may be used for supporting a patient during a surgical procedure and for transporting said patient. The operating table 1 comprises a mobile operating table column 28 according to the disclosure, and a midsection 4 of a patient support surface P arranged on top of the operating table column 28.

From bottom to top, the operating table column 28 comprises a base 2 for placing the operating table column 28 on a surface and a column shaft 3 upon which the patient support surface P is firmly connected. However, in other embodiments of the operating table column 28, the patient support area P may be removably attached to the column shaft 3.

Column shaft 3 is designed to be height-adjustable and has a housing G, which protects an internal height-adjusting mechanism from contamination.

The midsection 4 of the patient support area P may be extended as needed by attaching various support section sections. Hence, the midsection 4 comprises interfaces ST for detachable connection with further support area sections (FIG. 3). For example, the patient support surface P may include the shown midsection 4, as well as a head section, a back section, and a foot section attached to midsection 4. In the following, a distinction is made between a head side KS and a foot side FS of the midsection 4 of the patient support section P. The head side KS is the side upon which the patient's head is placed during a surgical operation. The foot side FS is the side upon which the patient's foot is placed during a surgical operation.

The base 2 comprises a case 20 and a detachable two-part cover 21*a-b*, which is arranged thereon (FIG. 3). The case 20 is substantially rectangle-shaped having two lengths A and two widths B. The lengths A of the case 20 are curved concavely outside its corners in the peripheral area toward a center M of the base 2 (see FIG. 4).

Figure 4:
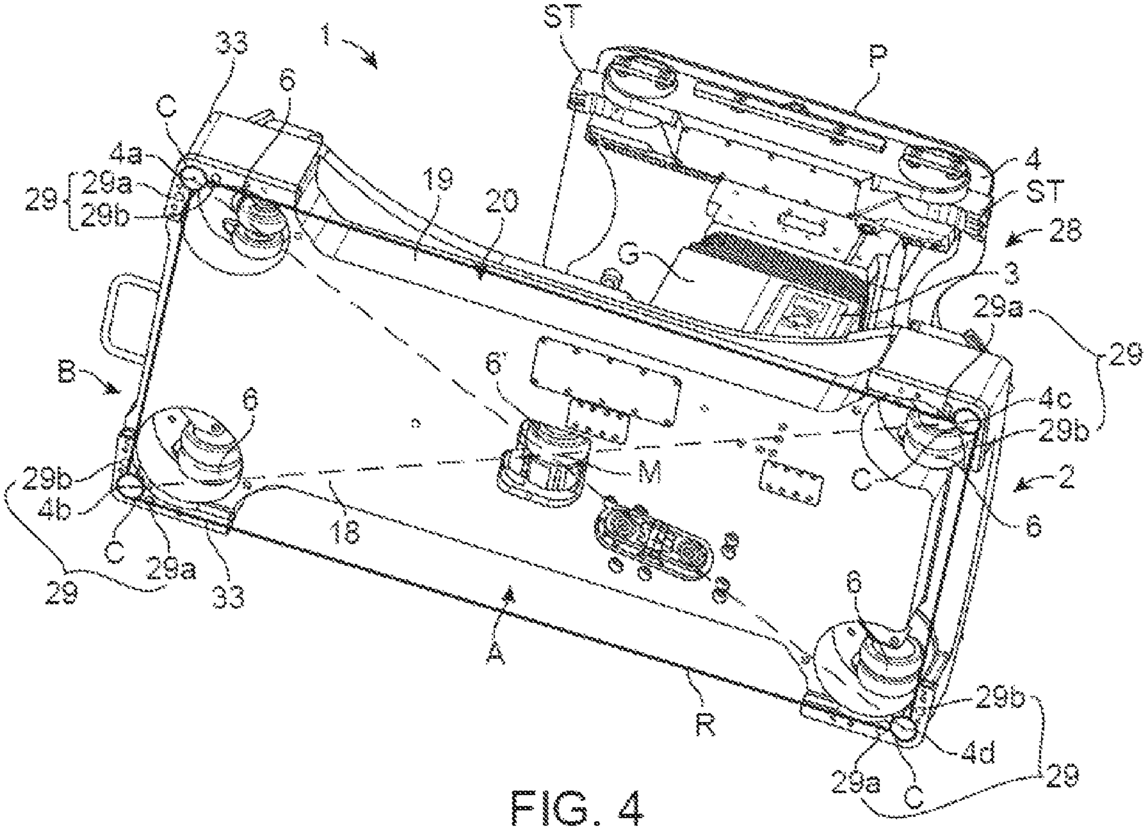
FIG. 4 is a perspective view from below the operating table of FIG. 3, showing the parts of the stability system, which, according to the disclosure, are located on the bottom surface of the base.

The column shaft 3 is arranged offset in relation to the center of the base 2 along the longitudinal direction of the base 2 (FIGS. 3, 4). Accordingly, base 2 has a base side width 2*a* and a base side length 2*b*, wherein the base side width 2*a* is associated with face side KS of the midsection 4 and the base side length 2*b* corresponds to the foot side FS of the midsection 4.

In FIG. 4, the base 2 is shown in a perspective bottom view. A base plate 18 of the case 20 is shown there and is continued vertically upward, i.e., in the direction of the patient support surface P, through a collar 19. The bottom plate 18 is framed by four bottom contact elements 33.

Moreover, base 2 shown in FIG. 4 includes four retractable and extendable passive castors 6 for moving the operating table column 28 on a surface. The castors 6 are located at four different corners of the base 2, in circular recesses of the base plate 18.

a. Preferably, the surface area spanned jointly by the castors 6 is smaller than the surface area spanned jointly by the upright support elements 4*a-d*.
b. When viewing the base 2 from below, as in FIG. 4, it can be seen that the castors 6 are arranged further inward than are the upright support elements 4*a-d*, or, considered the other way around, the upright support elements 4*a-d* are located further out on the base 2, than are the castors 6.

To place operating table column 28 on a surface, the castors 6 are retracted into the case 20 of the base 2. An extendable drive roller 6' is also shown. It can also be retracted and extended and provides motorized support for the surgical staff, when moving the operating table column 28.

The operating table column 28 according to the disclosure comprises a stability system 4, 5, 29 in order to ensure that the base 2 is securely positioned on any surface, in particular an uneven surface (see FIG. 4). The stability system 4, 5, 29 has four support surfaces 29, four upright support elements 4*a-d* and an actuator 5 (see FIG. 4 in connection with FIG. 6).

The support surfaces 29 are situated at the four corners of the base 2 on the bottom of the bottom contact elements 33 (FIG. 4). The support surfaces 29 shown in FIG. 4 are designed as additional stability elements 29*a*, 29*b* of the stability system 4, 5, 29 and come into contact with the surface, when the operating table column 28 is put down. Each support surface 29 includes two spaced-apart auxiliary stability elements 29*a*, 29*b*, which may be formed, e.g., as circular buffers or blocks.

The present stability system 4, 5, 29 is designed such that each of the four support surfaces 29 is associated with a respective upright support element 4*a-d* positioned between the two additional stability elements 29*a*, 29*b*, which may be moved vertically with respect to this support surface 29.

The four upright support elements 4*a-d* are designed as main stability elements. As shown in FIG. 4, they may be in the form of, e.g., support plates or discs. The upright support elements 4*a-d* may be retracted into vertical cylindrical holes C provided for this purpose in case 20 of the base 2, from which they may be re-extended. Upon extension, they jointly span a rectangular support surface R of the base 2 on a floor surface (FIG. 4).

As shown in FIG. 4, the upright support elements 4*a-d* may be arranged directly in the upright support elements 33. However, in alternative embodiments, the upright support elements 4*a-d* may be arranged adjacent to the four bottom contact elements 33. Depending on the embodiment, the upright support elements 4*a*-*d* may be arranged within the support surfaces 29. The four bottom contact elements 33, the support surfaces 29 and the upright support elements 4*a*-*d* may be positioned peripherally, e.g., at four corners and/or at the outer edge area on the bottom surface, e.g., the base plate 18, or at other locations of the mobile base 2. The bottom contact elements 33 shown in FIG. 4 are L-shaped. The support surfaces 29 are circular. However, in further embodiments of the disclosure, the bottom contact elements 33 and the support surfaces 29 may have a different shape, which does not compromise their functionality. For example, in a departure from the angular shape, the bottom contact elements 33 may take the form of a square, rectangle, circle, or other basic shape. The support surfaces 29 may be formed as a part of a bottom contact element 33, which is an independent component of the base 2. The support surfaces 29 may alternatively be simple surfaces on the bottom surface of base 2, which face the surface and regularly come into contact therewith.

The stability system 4, 5, 29 further comprises the actuator 5 whereby the upright support elements 4*a*-*d* may be extended from the cylindrical holes C and retracted into them again. The actuator is arranged in a two-part receptacle 22 of the base 2 formed by the case 20 (see FIG. 5).

The actuator 5 may be designed, e.g., as a hydraulic, pneumatic or electromotive actuator. It is configured to lock each upright support element 4*a*-*d* in its extended position. It ensures that, irrespective of their distance to the surface, the force-controlled upright support elements 4*a*-*d* keep extending until the operating table column 28 is in a secure position. In the present case, the actuator 5 is arranged such that all the upright support elements 4*a*-*d* can be extended with substantially the same force.

The operating table column 28 can be transferred from a moving position to a stationary position and vice versa by way of a user command. In the travel position, the castors 6 are extended and the operating table column 28 rests on the castors 6 such that they can be moved on the floor. In the stationary position, the castors 6 are retracted and the stability system 4, 5, 29 is activated, such that the operating table column with its base 2 rests firmly and securely on the floor.

The stability system 4, 5, 29 of the present operating table column 28 may assume three different operating states, i.e., a raised state and two parked states.

In the raised state, which occurs when the operating table column 28 is in the travel position, the upright support elements 4*a*-*d* are retracted. Both the upright support elements 4*a*-*d* and the four support surfaces 29 of the base 2 are raised from the floor and in their raised state, i.e., they are no longer in contact with the floor.

The lowered position operating states include a transition state, which lasts only for a brief moment during flawless operation, a so-called parked state, and a target state, referred to as a fixed stationary state. These two states are characterized in that the castors 6 are retracted and the base 2 is lowered onto the surface, where it then rests.

In the parked state, the base 2 is seated on the surface with at least three of the support surfaces 29, and the upright support elements 4*a*-*d* are retracted.

In the fixed stationary state, the base 2 rests on the floor with at least three of the support surfaces 29, however, the upright support elements 4*a*-*d* are extended, such that they also contact the floor, ensuring that the base 2 rests securely on the floor.

Figure 6:
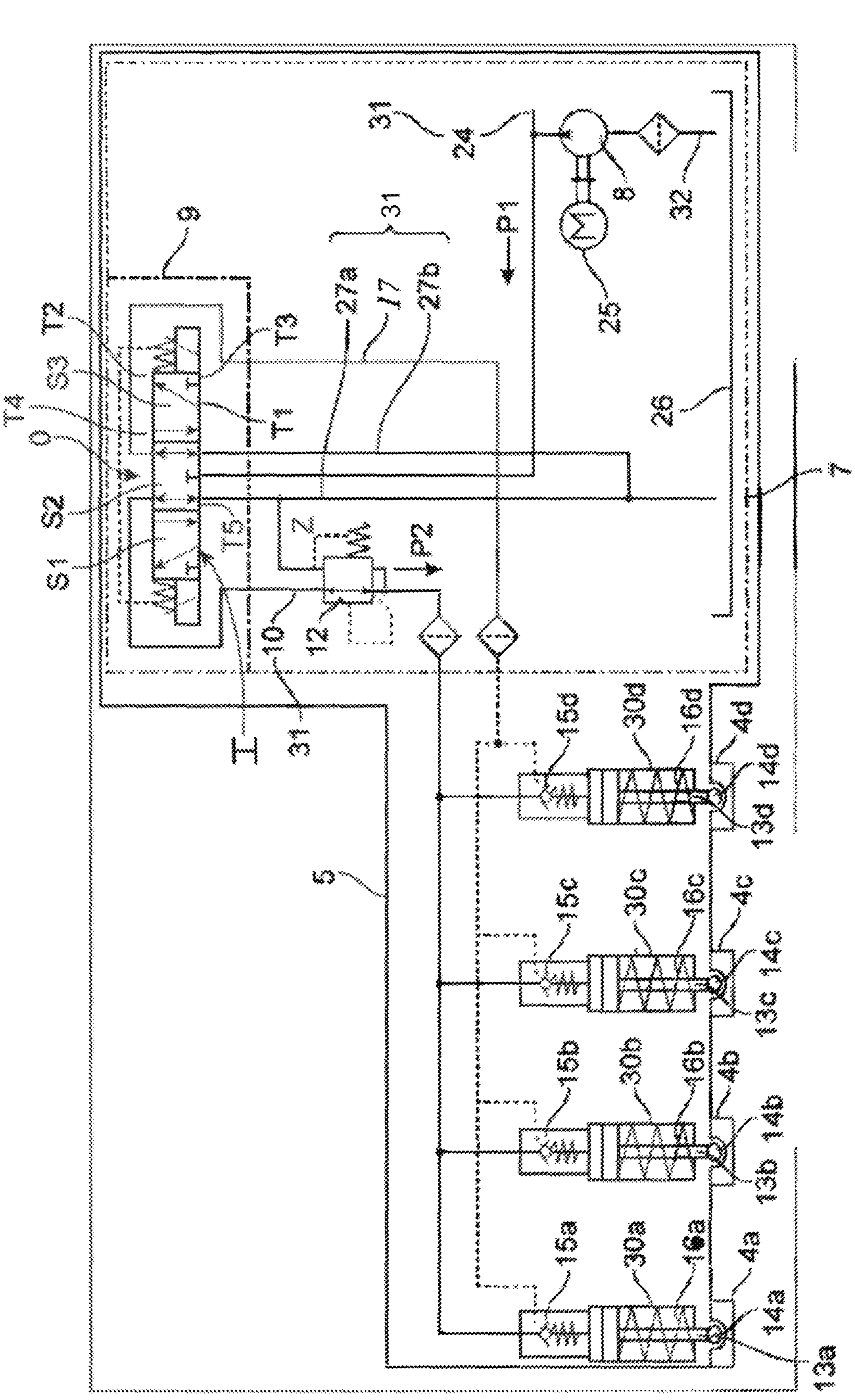
FIG. 6 is a schematic representation of the hydraulic circuit of the stability system according to the disclosure.

FIG. 6 represents a hydraulic circuit diagram of the stability system 4, 5, 29 including the actuator 5 and the upright support elements 4*a*-*d* (without support surfaces 29). The components of the actuator 5 are separated from the upright support elements 4*a*-*d* by a dividing line. The actuator 5 comprises all the components located within the polygon defined by the dividing line.

The actuator 5 comprises four positioning members 30*a*-*d*, which are connected to a switching unit 9 of the control device 7 by means of two hydraulic lines of a hydraulic line system 31, i.e., an inlet and outlet conduit 10 and a release line 17 (FIG. 6).

FIG. 6 shows that each upright support element 4*a*-*d* of the base 2 of FIG. 4 is associated with a separate positioning member 30*a*-*d*, which allows the upright support element 4*a*-*d* to be retracted and extended. In one embodiment of the present stability system 4, 5, 29, four positioning members 30*a*-*d* in the form of single-acting hydraulic cylinders are used to force-control each of the four upright support elements 4*a*-*d* (see FIG. 6).

For this purpose, each upright support element 4*a*-*d* is attached to a piston rod 13*a*-*d* of the hydraulic cylinder 30*a*-*d* associated with it (FIG. 6). In some embodiments, the upright support elements 4*a*-*d* may be pivotally connected to the piston rods 13*a*-*d*, such that the support surface of each upright support element 4*a*-*d* automatically adjusts to the slope of the floor. This connection may be achieved, e.g., by means of a ball joint 14*a*-*d* or a swivel joint. The ball joints 14*a*-*d* shown in FIG. 6 ensure that the upright support elements 4*a*-*d* may lie flat even on an uneven surface. However, in other embodiments of the stability system 4, 5, 29, the upright support elements 4*a*-*d* may be connected in some other way to the hydraulic cylinders 30*a*-*d*.

The piston rods 13*a*-*d* are extended from the hydraulic cylinders 30*a*-*d* by means of hydraulic pressure.

Each of the hydraulic cylinders 30*a*-*d* also comprises a return spring 16*a*-*d* arranged in its interior (FIG. 6). The return springs 16*a*-*d* make possible the retraction of a piston rod and thus serve to retract the respective upright support element 4*a*-*d*.

In addition, each hydraulic cylinder 30*a*-*d* has an associated check valve 15*a*-*d* arranged on its upper section and which check valve is provided for locking the respective upright support element 4*a*-*d* in an extended target position on the surface (FIG. 6). The check valves 15*a*-*d* are spring-loaded and are used to shut off oil flowing in one direction, while also allowing oil to flow freely in an opposite direction. In the present case, the check valves 15*a*-*d* are releasable, which is possible by means of the release line 17, but alternative means are also possible.

Figure 5:
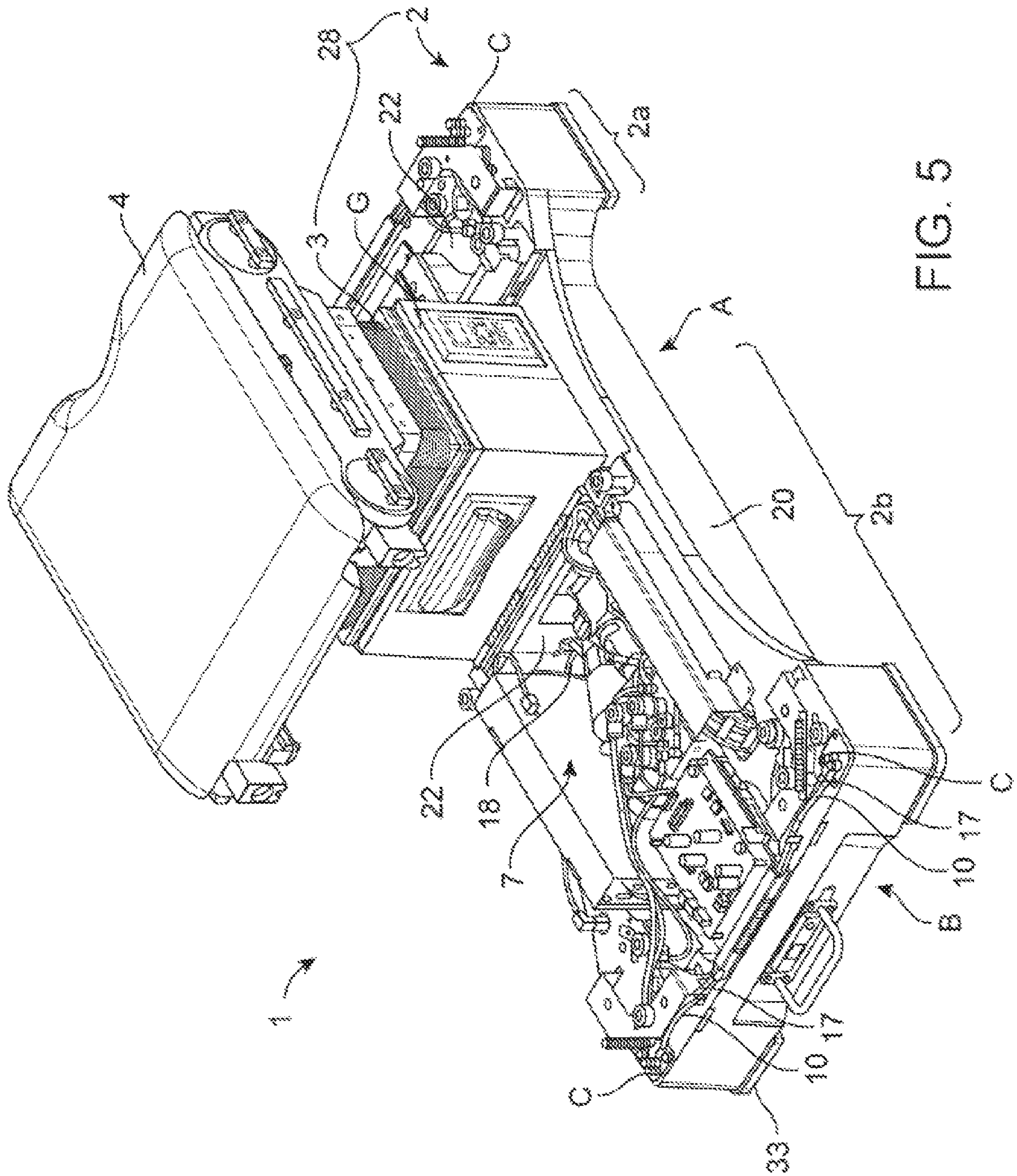
FIG. 5 is a perspective view from above of the operating table of FIGS. 3 and 4 without a cover for the base with some elements of a stability system actuator arranged in the base.

All four hydraulic cylinders 30*a*-*d* are controlled jointly and centrally by the control device 7 located in case 20 of the base 2 (FIG. 5). The control device is arranged on the bottom plate 18 of base 2.

The positioning members 30*a*-*d* of the present exemplary embodiment are based on hydraulic movement and a locking system. However, additional stability systems according to the disclosure may use other types of positioning members 30, such as pneumatic or electromotive positioning members or positioning members moved by electric motors and/or other electrical components.

Check valves 15*a*-*d*, electronically controlled valves, or other arrangements that hold hydraulic or pneumatic fluids in the positioning members may be used to lock and unlock hydraulic or pneumatic positioning members. This will ensure that the positioning members 30 are maintained in an extended position under pressure. When using hydraulic systems, various known hydraulic fluids may be employed.

The control device 7 comprises a central drive unit 8, a switching unit 9, an oil tank 26, a force-limiting unit 12, a motor 25, and a part of the hydraulic line system 31, namely a pump line 32, an outlet line 24, a double tank line 27*a*, 27*b*, and a section of the inlet and outlet conduit 10 and the release line 17.

FIG. 6 shows that drive unit 8 is hydraulically connected to the oil tank 26 via the pump line 32, as well as to the input side of the switching unit 9 via outlet line 24. On the input side, the switching unit 9 is in addition hydraulically connected to the oil tank 26 via the double tank line 27*a,b*. The switching unit 9 is connected on the output side to the check valves 15*a-d* of the hydraulic cylinders 30*a-d* via the inlet and outlet conduits 10 and the release line 17.

The drive unit 8 shown in FIG. 6 is designed, e.g., as a hydraulic pump. The hydraulic pump 8 is coupled to a motor 25 (e.g., an electric motor). It generates the required hydraulic pressure for all the hydraulics of the operating table column 28. Thus, it is not merely used to a drive all the hydraulic cylinders 30*a-d* simultaneously. It generates a hydraulic pressure P1 (also referred to as an oil pressure) in the outlet line 24 of, e.g., 140 bar and is many times greater than the maximum hydraulic pressure P2 provided for extending the hydraulic cylinders 30*a-d*.

The switching unit 9 of the control device 7 is used to allocate the flow of oil from the oil tank 26 to either the inlet and outlet conduits 10, or the release line 17. The switching unit 9 is preferably in the form of a single hydraulic switching valve, for example a 5/3-way valve.

The 5/3-way valve 9 shown in FIG. 6 is a solenoid valve having five ports T1 to T5, and can assume three switching positions S1 to S3. The first, third and fifth ports T1, T3 and T5 are located on the input side I of the valve 9 and the second and fourth ports T2, T4 are located on the output side O of valve 9. The outlet line 24 is connected here to the first port T1, the release line 17 is connected to the second port T2, the tank line 27*b* is connected to the third port T3, the supply and drain line 10 is connected to the fourth port T4, and the tank line 27*a* is connected to the fifth port T5.

In the initial switching state S1 of the 5/3-way valve 9 shown in FIG. 6 on the left, the first port T1 is connected to the fourth port T4, and the second port T2 is connected to the third port T3, while the fifth port T5 is blind, i.e., closed. Thus, the outlet line 24 is hydraulically connected to the inlet and outlet conduits 10, and the release line 17 is hydraulically connected to the tank line 27*b*. The tank line 27*a* remains closed.

In a second switching state S2 of the 5/3-way valve 9 (middle state), shown in FIG. 6, the fourth port T4 is connected to the fifth port T5, such that the inlet and outlet conduits 10 are hydraulically connected to the tank line 27*a*. Further, the second port T2 is connected to the third port T3, such that the release line 17 is connected to the tank line 27*b* leading to the oil tank 26. The first port T1 along with the outlet line 24 remains closed.

The 5/3-way valve 9 further has a third switching state S3, in which the fourth port T4 is connected to the fifth port T5, and the first port T1 is connected to the second port T2, while the third port T3 is blind-connected. In this state, the inlet and outlet conduits 10 are hydraulically connected to the tank line 27*a*, such that hydraulic oil may drain into the oil tank 26. The outlet line 24 is hydraulically connected to the release line 17 Tank line 27*b* is closed.

The oil pressure P1 generated by the hydraulic pump 8 may be guided via outlet line 24 to the 5/3-way valve 9 and either blocked in the middle state S2 by the blind-switched first connection T1 there, or passed on to the inlet and outlet conduit 10 in order to extend the hydraulic cylinders 30*a-d* (initial switching state S1) or to the release line 17 in order to retract the hydraulic cylinders 30*a-d* (third switching state) S3.

The control device 7 further comprises a force-limiting unit, 12 such as a pressure reducing valve. The pressure reducing valve 12 is located as a safety valve in the inlet and outlet conduit 10 between the 5/3-way valve 9 and the check valves 15*a-d* (FIG. 6). The pressure reducing valve 12 is further connected to the tank line 27*a* via a branch Z. In the event of overpressure, i.e., when the hydraulic pressure in the inlet and outlet conduits 10 exceeds the intended maximum low pressure P2, e.g., 20 bar, the pressure reducing valve 12 opens the branch Z. Hydraulic oil is thus guided back into tank 26, until the pressure again drops below 20 bar, whereupon branch Z is re-closed. This ensures that the hydraulic pressure in the inlet and outlet conduits 10 supplied to the hydraulic cylinders 30*a-d* does not exceed the predetermined maximum low pressure P2.

The function of the stability system 4, 5, 29 of the operating table column 28 according to the disclosure will be described below.

The purpose of the stability system 4, 5, 29 is to provide a proper and reliable upright position of the operating table column 28 during a surgical operation. It is automatically activated as soon as a user has moved the operating table column 28 to a preferred location and, e.g., deactivation of the operating table column 28 is triggered via a remote control. Such user input causes the operating table column 28 to change from its travel position to its stationary position. In other words, first the castors 6 are retracted into the base 2 such that the base 2 rests on the floor. The stability system 4, 5, 29 is then activated.

When the base 2 touches down on the floor, it initially rests on at least three of the support surfaces 29. More specifically, first it rests on at least six of the eight buffers 29*a*, 29*b*. Whether it rests on three or four support surfaces depends on the evenness of the surface whereupon it is placed. It is possible that the floor of the operation theater is not completely even, such that the base will only come to rest on three support surfaces. This may cause the operating table column to tilt, when the center of gravity is shifted, which is undesirable during a surgical operation. To exclude this, the operating table column 28 is equipped with a stability system 4, 5, 29. The aforementioned state corresponds to the parked state of the stability system 4, 5, 29. When functioning properly, the parked state is only a brief temporary state until the upright support elements 4*a-d* are extended and the stability system 4, 5, 29 transitions to the fixed stationary state. The upright support elements 4*a-d* extend until they contact the floor. They all extend at the same time and with the same pressure of 20 bar. Depending on the local features of the floor, the upright support elements 4*a-d* may extend to different extents. In this way, any unevenness is evened out. Thus the base 2 is firmly contacting the floor at all four corners. This eliminates the possibility of tipping. The upright support elements 4*a-d* are deliberately extended using a low pressure of only 20 bar. This pressure is sufficient to ensure that the upright support elements 4*a-d* rest securely on the floor. However, it is too low to support the heavy weight of the operating table column 28. Accordingly, extension of the upright support elements 4*a-d* will not make it possible for the base 2 to raise from the floor.

Accordingly, in the fixed stationary state of the stability system 4, 5, 29, the upright support elements 4*a-d* are in an extended position, such that they contact the floor. When the table column 28 is placed on a level floor, preferably none of the upright support elements 4*a-d* are extended such that they will extend vertically in the direction of the floor beyond the adjacent contact areas 29*a-d* on the floor. When placing the table column 28 on an uneven surface, at least one upright support element 4*a-d* may be extended in a vertical direction all the way down to the floor and beyond its associated contact area 29*a-d*, which at no point contacts the floor.

Preferably, the extended upright support elements 4*a-d* are preferably prestressed or under sufficient pressure in order to exert pressure against the floor and thus prevent the operating table column 28 from wobbling or tilting. However, the prestress or pressure is insufficient to lift off the floor or tilt any or all of the parts of the operating table 1 or column 28. An appropriate pressure for each of the upright support elements 4*a-d* may be, e.g., roughly 20 bar, 15-30 bar, 10-40 bar, and/or 5-50 bar. In some embodiments of the disclosure, the pressure corresponds to a predetermined hydraulic pressure P2 selected for the system. In other embodiments, the pressure is limited by the pressure reducing valve 12, which is calibrated in order to reduce a high pressure to a predetermined value (e.g., P2). The pressure level or prestress may be selected based on the weight of the device to be stabilized (e.g., the operating table 1).

Should a malfunction occur in the hydraulic system causing the upright support elements 4*a-d* to suddenly retract in an undesirable fashion, during patient operation, the stability system 4, 5, 29 merely switches from the fixed stationary state to the parked state. The operating table column 28 is then no longer as tilt-resistant as before. However, since it then continues to rest on at least three support surfaces 29, this malfunction does not manifest itself as sudden unwanted wobbling or sagging of the operating table column 28. Only an unfavorable shift of the center of gravity can cause slight tipping on an uneven surface. This is acceptable, until the hydraulics can be repaired.

When the operating table column 28 is to be moved away again, the user issues an appropriate command (e.g., via a remote control), whereupon the stability system 4, 5, 29 is deactivated, i.e., the upright elements 4*a-d* retract again. The castors 6 then extend until the operating table column 28 rests thereon.

The stability system disclosed herein includes, for example, in contrast to the entirely hydraulic stability system of U.S. Pat. No. 5,564,662, additional non-traversable (so-called stationary) support surfaces 29 arranged in all corners of the base 2 on the bottom surface of the bottom contact elements 33. Thus, the functionality of the stability system according to the disclosure is not exclusively dependent on hydraulics or electrics.

The disclosed system is designed such that a malfunction of the hydraulic upright support elements 4*a-d* only has a minor effect on the stability of the operating table column 28. In fact, the upright support elements 4*a-d* are extended to compensate for any unevenness of the floor and prevent the patient support surface P from wobbling, without the foot 2 being raised off the floor. On a level floor, the total weight of the table column 28 is supported by the support surfaces 29 and thus simultaneously by the bottom contact elements 33, such that the upright support elements 4*a-d* do not extend beyond the contact points of the support surfaces 29 with the floor. On an uneven surface, sometimes only two or three of the support surfaces 29 are in direct contact with the floor, depending on the unevenness. Each upright support element 4*a-d*, which is associated with a support surface 29 not in contact with said surface, extends only as far as the distance between the support surface 29, which is not in contact with the floor, and the floor itself. This distance is typically very little, e.g., less than one centimeter or less than two centimeters, and often only a few millimeters. In the event of a malfunction of the hydraulic and/or electrical part of the stability system resulting in the retraction of the upright support elements 4*a-d* into the base 2, the weight of the table column 28 continues to be supported by the support surfaces 29. This prevents abrupt sagging or severe tipping of the operating table 1, such that at most minimal wobbling would be possible on a very uneven surface. Thus, the stability system according to the disclosure is characterized by a particularly high reliability and safety during operation.

The hydraulic processes of the stability system 4, 5, 29 during activation and deactivation will now be described below.

Activation of the Hydraulic Part of the Stability System 4, 5, 29

To activate the actuator 5 of the present stability system 4, 5, 29, the hydraulic pump 8 is first switched on in order to draw hydraulic oil from the oil tank 26, e.g., via a suction valve. After a brief delay, the 5/3-way valve 9 is actuated such that it changes to the first position S1. The sucked-out hydraulic oil is directed through the pump line 32 to the hydraulic pump 8, and then passes through the outlet line 24 and the 5/3-way valve 9. The hydraulic oil is further directed into the inlet and outlet conduits 10 and through the pressure reducing valve 12. The oil pressure P1 is thus reduced to the predetermined hydraulic pressure P2, and the hydraulic oil is further pumped through the four check valves 15*a-d* toward the four hydraulic cylinders 30*a-d*. Flow passes through the piston chambers of the hydraulic cylinders 30*a-d*. The piston rods 13*a-d* of all hydraulic cylinders 30*a-d* extend simultaneously until the support elements 4*a-d* attached thereto contact the floor with the applied pressure P2 and support themselves. As long as the hydraulic pressure P2 is maintained in the inlet and outlet conduits 10, the upright elements 4*a-d* contact the surface with the same force.

Subsequent switching of the 5/3-way valve 9 to the middle position S2 gives rise to a pressure drop in the inlet and outlet conduit 10 and make the non-return valves 15*a-d* close. At the same time, pump 8 is switched off. The closed check valves 15*a-d* ensure that the oil pressure in the hydraulic cylinders 30*a-d* is maintained even after the hydraulic pump 8 has stopped pumping oil, and that the upright support elements 4*a-d* remain locked in place. This operating state corresponds to the fixed stationary state of the stability system 4, 5, 29 in which any wobbling or tilting of the operating table column 28 is excluded.

Deactivation of the Hydraulic Part of the Stability System 4, 5, 29

To deactivate the present stability system 4, 5, 29, the hydraulic pump 8 is switched on again and, with a slight delay, the 5/3-way valve 9 is actuated such that it changes to position S3. In this way, hydraulic pressure is applied to the release line 17. This pressure causes unlocking of the check valves 15*a-d* integrated in the hydraulic cylinders 30*a-d*. The unlocked check valves 15*a-d* allow hydraulic oil to flow freely from the hydraulic cylinders 30*a-d* into the oil tank 26 via the supply and drain lines 10, the valve 9, and the associated tank line 27*a*.

The driving force required for this is a result of the spring force of the return springs 16*a-d* of the hydraulic cylinders 30*a-d*. The pressure applied to the hydraulic cylinders 30*a-d* then continuously decreases and the piston rods 13*a-d* of the hydraulic cylinders 30*a-d* are retracted. Consequently, contact between the support elements 4*a-d* attached to the piston rods 13*a-d* and the substrate is eliminated. In this parked state, the base 2 only rests on the floor with at least three of the support surfaces 29.

The invention claimed is:

1. A mobile operating table column comprising:
   - a base comprising a bottom base plate;
   - castors for moving the operating table column on the floor, the castors being retractable and deployable; and
   - a stability system configured to stabilize the base on a floor, wherein the stability system comprises the following:
   - four bottom contact elements at four different corners of the base, the four bottom contact elements framing the bottom base plate of the base;
   - four retractable and extendable upright support elements, each of the four upright support elements arranged within or adjacent to a corresponding one of the four bottom contact elements, and each of the four upright support elements being movable between a retracted position in which the upright support element is retracted into the base, and a deployed position in which the upright support element is extended from its retracted position; and
   - an actuator for retracting and deploying each of the upright support elements,
   - the stability system being configured to assume at least the following two different operating states:

i) a parked state, in which at least three of the bottom contact elements of the base contact the floor and the upright support elements are in their retracted positions within the base, the castors being retracted when the stability system is in the parked state; and ii) a fixed stationary state, in which at least three of the bottom contact elements of the base contact the floor and the upright support elements are in their deployed positions such that they contact the floor and thereby stabilize the base on the floor.

2. The mobile operating table column according to claim 1, wherein the actuator is configured to lock each upright support element in its respective deployed position, as soon as the base is stabilized on the floor.

3. The mobile operating table column according to claim 1, wherein the actuator is configured to simultaneously retract or deploy all the upright support elements.

4. The mobile operating table column according to claim 1, further comprising a separate positioning member associated with each upright support element, the separate positioning member being configured to enable the retraction and deployment of its respective support element.

5. The mobile operating table column according to claim 4, further comprising a control device configured to jointly and centrally control all the positioning members.

6. The mobile operating table column according to claim 4, wherein the positioning members are hydraulic cylinders.

7. The mobile operating table column according to claim 6, wherein each hydraulic cylinder has a check valve associated therewith and directly arranged thereon for locking the respective upright support element when the upright support element contacts the floor.

8. The mobile operating table column according to claim 6, wherein each hydraulic cylinder has a return spring for retracting the respective upright support element.

9. The mobile operating table column according to claim 1, wherein the actuator is a hydraulic, pneumatic or electromotive actuator.

10. The mobile operating table column according to claim 1, wherein the actuator is configured to deploy all upright support elements with substantially the same force.

11. The mobile operating table column according to claim 1, wherein the bottom contact elements are spaced apart from the castors.

12. The mobile operating table column according to claim 1, wherein the stability system is further configured to assume a raised state as an operating state, the raised state being different from the parked state and the fixed stationary state, and wherein in the raised state the upright support elements are in their retracted positions and both the upright support elements and the bottom contact elements are raised from the floor.

13. The mobile operating table column according to claim 12, wherein the stability system is in the raised state when the mobile operating table column is in a travel position in which the castors are deployed and the mobile operating table column rests on the castors such that the mobile operating table column is moveable on the floor.

14. The mobile operating table column according to claim 1, further comprising four support surfaces, each associated with a corresponding one of the bottom contact elements and a corresponding one of the upright support elements, each support surface comprising two spaced-apart stability elements, the corresponding upright support element being positioned between the corresponding two spaced-apart stability elements, and the two spaced-apart stability elements associated with at least three of the bottom contact elements contact the floor in the parked state.

15. A mobile operating table column, comprising:
   - a base comprising a bottom base plate;
   - castors for moving the operating table column on the floor, the castors being retractable and deployable; and
   - a stability system configured to stabilize the base on a floor, the stability system comprising:
   - four or more bottom contact elements on the base;
   - four or more retractable and extendable upright support elements, each of the four or more upright support elements arranged within or adjacent to a corresponding one of the four or more bottom contact elements, and each of the four or more upright support elements being movable between a retracted position in which the upright support element is retracted into the base, and a deployed position in which the upright support element is extended from its retracted position; and
   - an actuator for retracting and deploying each of the upright support elements,
   - the stability system being configured to assume at least the following two different operating states:

i) a parked state, in which at least three of the bottom contact elements of the base contact the floor and the upright support elements are in their retracted positions within the base, wherein the castors are retracted when the stability system is in the parked state; and ii) a fixed stationary state, in which at least three of the bottom contact elements of the base contact the floor and the upright support elements are in their deployed positions such that they contact the floor and thereby stabilize the base on the floor.

16. The mobile operating table column according to claim 15, further comprising a separate positioning member associated with each upright support element, the separate positioning member being configured to enable the retraction and deployment of its respective support element, and wherein the control device comprises a central drive unit configured to jointly and simultaneously drive all the positioning members.

17. The mobile operating table column according to claim 15, further comprising a separate positioning member associated with each upright support element, the separate positioning member being configured to enable the retraction and deployment of its respective support element, and wherein the control device comprises a single central switching unit configured to simultaneously control the positioning members.

18. The mobile operating table column according to claim 17, wherein the switching unit is a hydraulic switching valve.

19. The mobile operating table column according to claim 18, wherein the positioning members comprise hydraulic cylinders, and the hydraulic switching valve is hydraulically connected to the hydraulic cylinders via an inlet and outlet conduit and a separate release line.

20. The mobile operating table column according to claim 19, wherein the control device further comprises a single central-force limiting unit associated with the inlet and outlet conduits and configured to reduce a pressure in said inlet and outlet conduits to a predetermined pressure whereby all upright support elements can be simultaneously deployed.

21. A mobile operating table column comprising:

a base comprising a bottom base plate;

castors for moving the operating table column on the floor, the castors being retractable and deployable; and a stability system configured to stabilize the base on a floor, wherein the stability system comprises:

four bottom contact elements at four different corners of the base;

four retractable and extendable upright support elements, each of the four upright support elements arranged within or adjacent to a corresponding one of the four bottom contact elements, and each of the four upright support elements being movable between a retracted position in which the upright support element is retracted into the base, and a deployed position in which the upright support element is extended from its retracted position; and an actuator for retracting and deploying each of the upright support elements, the stability system being configured to assume at least the following two different operating states:

i) a parked state, in which at least three of the bottom contact elements of the base contact the floor and the upright support elements are in their retracted positions within the base, the castors being retracted when the stability system is in the parked state; and ii) a fixed stationary state, in which at least three of the bottom contact elements of the base contact the floor and the upright support elements are in their deployed positions such that they contact the floor and thereby stabilize the base on the floor.

* * * * *